Figure 1:
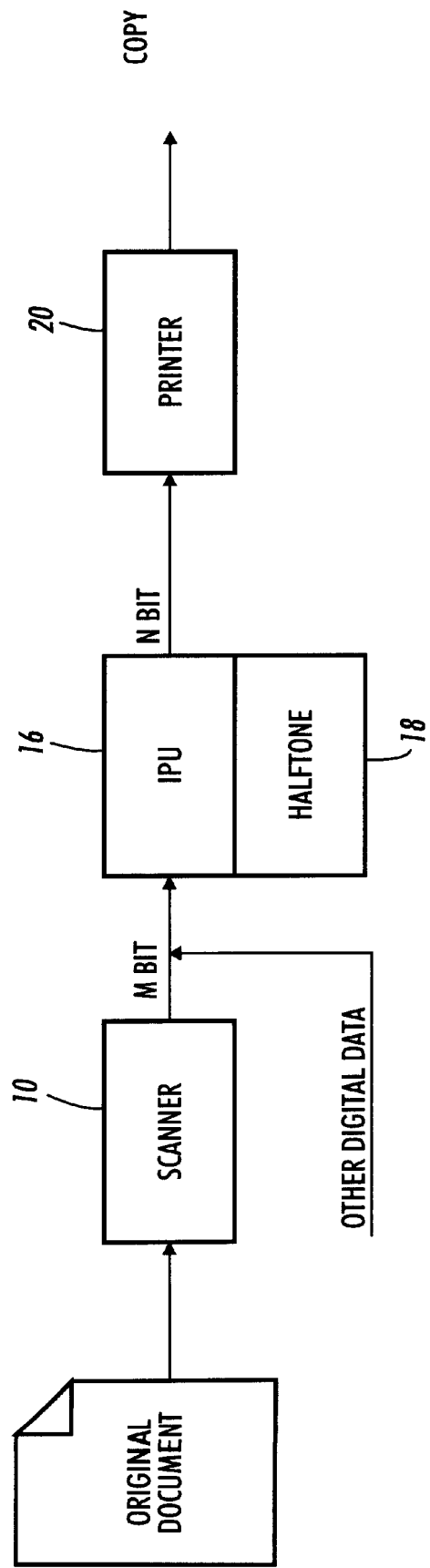

United States Patent
Wang

Patent Number: 5,978,556
Date of Patent: *Nov. 2, 1999

[54] CLUSTERED HALFTONE DOT DESIGN PROCESS

[75] Inventor: Shen-ge Wang, Fairport, N.Y.

[73] Assignee: Xerox Corporation, Stamford, Conn.

[ * ] Notice: This patent is subject to a terminal disclaimer.

[21] Appl. No.: 09/114,833

[22] Filed: Jul. 14, 1998

Related U.S. Application Data

[62] Division of application No. 08/749,306, Nov. 14, 1996, Pat. No. 5,787,238.

[51] Int. Cl.$^6$ .............................. G06K 15/02; G06T 5/00; H04N 1/405; H04N 1/52
[52] U.S. Cl. ..................... 395/109; 358/457; 358/459; 358/460; 358/535; 358/536; 382/237; 382/270
[58] Field of Search .............................. 395/109; 358/298, 358/456, 457, 458, 459, 460, 466, 535, 536; 382/237, 270

[56] References Cited

U.S. PATENT DOCUMENTS

| | | |
|---|---|---|
| 4,149,194 | 4/1979 | Holladay . |
| 4,485,397 | 11/1984 | Schueter et al. . |
| 4,876,611 | 10/1989 | Fischer et al. ........................... 358/456 |
| 5,014,123 | 5/1991 | Imoto . |
| 5,341,228 | 8/1994 | Parker et al. ............................ 358/534 |
| 5,394,252 | 2/1995 | Holladay et al. ........................ 358/533 |

OTHER PUBLICATIONS

Eschbach et al, "Binarization using a two-dimensional pulse–density modulation"; J.Opt. Soc.Am.A; vol. 4, No. 10, Oct. 1987; pp. 1873–1878.

Eschbach; "Pulse–density modulcation on rastered media: combining pulse–density modulation and error diffusion"; J.Opt. Soc.Am.A; vol. 7, No. 4, Apr. 1990; pp. 708–716.

*Primary Examiner*—Scott Rogers
*Attorney, Agent, or Firm*—Mark Costello

[57] ABSTRACT

An idealized clustered screen is characterized spot clustering which is optimized so that clusters are about the same size and shape as they grow and are approximately equally distanced though an image. Pixels are swapped within the screen to vary its appearance. An optimization process iteratively checks a quality metric based on the optimum conditions, as pixels are swapped until an optimum screen appearance is obtained.

1 Claim, 3 Drawing Sheets

CLUSTERED HALFTONE DOT DESIGN PROCESS

This application is a divisional of application Ser. No. 08/749,306, filed Nov. 14, 1996 now U.S. Pat. No. 5,787,238.

The present invention is directed to a method and apparatus for designing halftone screens suitable for quantizing gray images represented at a number of levels higher than can be reproduced by an output device.

BACKGROUND OF THE INVENTION

Printers typically provide a limited number of output possibilities, and are commonly binary, i.e., they produce either a spot or no spot at a given location (although multilevel printers beyond binary are known). Thus, given an image or a separation in a color image having perhaps 256 possible density levels, a set of binary printer signals must be produced representing the contone effect. In such arrangements, over a given area in the separation having a number of contone pixels therein, each pixel value in an array of contone pixels within the area is compared to one of a set of preselected thresholds as taught, for example, in U.S. Pat. No. 4,149,194 to Holladay. The effect of such an arrangement is that, for an area where the image is a contone (continuous tone image), some of the thresholds will be exceeded, i.e. the image value at that specific location is larger than the value of the threshold for that same location, while others are not. In the binary case, the pixels or cell elements for which the thresholds are exceeded might be printed as black or some color, while the remaining elements are allowed to remain white or uncolored, dependent on the actual physical quantity described by the data. The described halftoning or dithering method produces an output pattern that is periodic or quasi-periodic in the spatial coordinates.

Dithering creates problems in color document reproduction where the repeating pattern of a screen through the image, when superposed over similar repeating patterns in multiple separations, can cause moire or other artifacts, particularly in printing systems with less than ideal registration between separations.

The binary halftone output is the result of the point-to-point comparison. For a dithering screen with a fixed number of elements, N, there are N possible different threshold values, therefore, the halftone image can simulate N+1 different gray levels. In the following discussion we use 1 to N to represent the N threshold values and use the following dithering rule:

If the input is less than the threshold, the output is zero, or black; otherwise, the output is one, or white.

The screened output forms a repeating cluster of spots, or a dot. Since the cluster size defines the line frequency of created halftone images, screens with a single cluster usually are limited in their size and do not provide enough simulated gray levels. One solution is using larger screens with multiple clusters. There are many dual dots and quad dots well designed and widely used. However, the design of halftone screens with a large number of clusters is very difficult by current techniques, which require frequent visual examination of trials and the experience of experts.

One of the advantages of stochastic, or non-periodic screening over periodic screening is the suppression of moire. In this respect, note also, U.S. Pat. No. 5,394,252 to Holladay et al.

In U.S. Pat. No. 5,341,228 to Parker et al., a halftoning system using a stochastic process known as a blue noise mask is described. Briefly, the procedure can be described as follows: 1) Starting at one gray level with a chosen dot pattern, or "seed", the process iteratively uses a Fast Fourier Transform (FFT) techniques with a "blue noise" filter to redistribute all spots in dot pattern and eliminate large visual "clumps"; 2) Next, the dot pattern is processed at the next gray level by increasing (or decreasing) certain number of black spots on the previously determined dot pattern. Existing black (or white) spots are not moved. The same filtering technique is used to distribute newly added (or subtracted) dots; 3) Step 2 is then repeated for all gray levels sequentially. At each step, the width of the blue-noise filter varies by an amount corresponding to the current gray level; 4). The summation of dot patterns for each gray levels is the blue noise mask generated. The mask is then used to generate a halftone screen. The result of described sequential design procedure strongly depends on the choice of the seed pattern. If the output is not a satisfactory one, the design procedure has to start over again by choosing different seed or changing the blue noise filter. Since the threshold value of each pixel of the dithering screen is fixed at the gray level when the corresponding dot is added (or eliminated), the freedom to locate undetermined pixels is getting smaller and smaller while the design sequence is approaching the end. These constraints limit further improvement of the image quality generated by blue noise masks.

U.S. Pat. No. 4,485,397 to Scheuter et al. describes a method for generating a non-periodic halftone distribution by determining areas of constant or nearly constant input density and by distributing a precalculated number of print dots inside each area based on a random or pseudo random number and some spatial constraints.

U.S. Pat. No. 4,876,611 to Fischer et al. describes another stochastic screening algorithm in which the print/no-print decision is based on a recursive subdivision of the print field maintaining average density over the larger print field.

A non-periodic halftoning scheme based on a pulse-density modulation is taught in "Binarization using a two-dimensional pulse-density modulation", by R. Eschbach and R. Hauck, Journal of the Optical Society of America A, 4, 1873–1878 (1987); and "Pulse-density modulation on rastered media: combining pulse-density modulation and error diffusion", by R. Eschbach, Journal of the Optical Society of America A, 7, 708–716 (1990). In pulse-density modulation a mathematical model is used that guarantees the local density of print pulses as a function of the input image data.

In U.S. patent application Ser. No. 08/663,419 by Shen-ge Wang, an idealized stochastic screen is characterized by having all of the predominant color dots (black or white) uniformly distributed. A process is described to approach this optimization by iteratively selecting pairs of threshold levels in the screen matrix, and measuring the approach to the idealized stochastic screen. The threshold values are then swapped in position to determine whether the swap improves the measurement or not. If it does, the swap is maintained. The process is iterated until the desired result is obtained.

The above references are herein incorporated by reference for their teachings.

SUMMARY OF THE INVENTION

The present invention is directed to a method of designing a halftone screen which is based on a function designed to approach an idealized clustered screen.

In accordance with one aspect of the invention, there is provide a printing system suitable for forming marks on a substrate at one of c possible levels of colorant, and receiving image signals represented at d possible levels, where d>c, and having a halftone processor to reduce the number of levels at which the image is represented from d levels to c levels in order to replicate gray level printing, including:

a memory, storing a set of halftone threshold level signals, each threshold signal corresponding to a unique location in a halftone cell;

a comparator, receiving said image signal and one of the halftone threshold signals from the memory, and producing an output signal at one of c possible levels, varying according to the comparison of said halftone threshold signal to said image signal to cause marking at a selected location on a substrate;

said set of threshold level signals together forming a screen matrix arranged for use with respect to the image to generate multiple clusters of printed spots within a single repetition of the screen and generated by a dot clustering optimization process which optimizes the screen by approximating a condition where:

A. At any level of the input, all clusters have the same shape and the same size; and B. All adjacent clusters are equal-distance separated.

In accordance with yet another aspect of the invention, there is provided a method of designing a halftone cell, for converting an image received at d levels, for reproduction at two levels, said cell having elements each corresponding to a pixel in a discrete area of an image the method including the steps: a) choosing a desired cluster pattern for said halftone cell; b) assigning threshold values to the halftone cell; c) generating halftone screens; d) calculating a quality metric, by measuring divergence from the conditions:

1. At any level of the input, all clusters have the same shape and the same size; and 2. All adjacent clusters are equal-distance separated.

e) randomly choosing a limited set of threshold values and swapping the threshold values; f) recalculating the quality metric and determining whether the quality metric has improved; g) determining whether to keep the swap or returning the screen to its initial state based on the determination of whether the quality metric has improved.

Consider a halftone screen with N elements and a constant input with the gray level equal to N/2, or the mean level of the gray-scale input. The binary output pattern should have 50% area in black and 50% in white. All elements in the halftone screen with thresholds greater than N/2 will generate black output pixels and those with thresholds less or equal to N/2 will generate white ones. Clustered-dot halftone screens gather the output pixels in clusters, black or white. If all black pixels at the mean level are grouped in distinguishable clusters, at any levels above the mean black pixels will be shown only inside the area specified by these clusters. This is also true for white pixels at all levels less than the mean. For example, a 45° rotation screen will generate a checker-board pattern at the mean level. Above mean, white clusters are merged into the white background and black clusters are shrunk in their sizes. The visual appearance of the output above mean depends only on the distribution of the black clusters. On the other hand, below the mean level, the background is black and the visual appearance depends on the distribution of white clusters. Hence, the distributions of all "visible" black clusters are totally controlled by pixels in black squares of the checker-board, while "visible" white clusters depend only on the distribution of pixels in white squares. Once the checker-board or another black-white pattern is given at the mean, we can divide the screen design into two steps. One process is for white clusters, or the distribution of all thresholds less or equal to the mean, and another is for black clusters, or the distribution of all thresholds greater than the mean. Although in the following discussion we will only describe the design for black clusters, with little modification the principle and the process can be applied to white clusters as well.

In U.S. patent application Ser. No. 08/663,419, we described an optimization technique for stochastic screen design. Briefly, we swap the threshold values of two randomly chosen pixels in the halftone screen. Evaluation of a merit function is conducted before and after swapping. If the swapping shows improvement with our criterion, we keep the new distribution, otherwise, we restore the values before swapping. This swapping process is repetitively conducted until an interruption is called or the merit function reaches the goal. We will use a similar optimization technique with a completely different merit function to design the clustered-dot screens.

Figure 2:
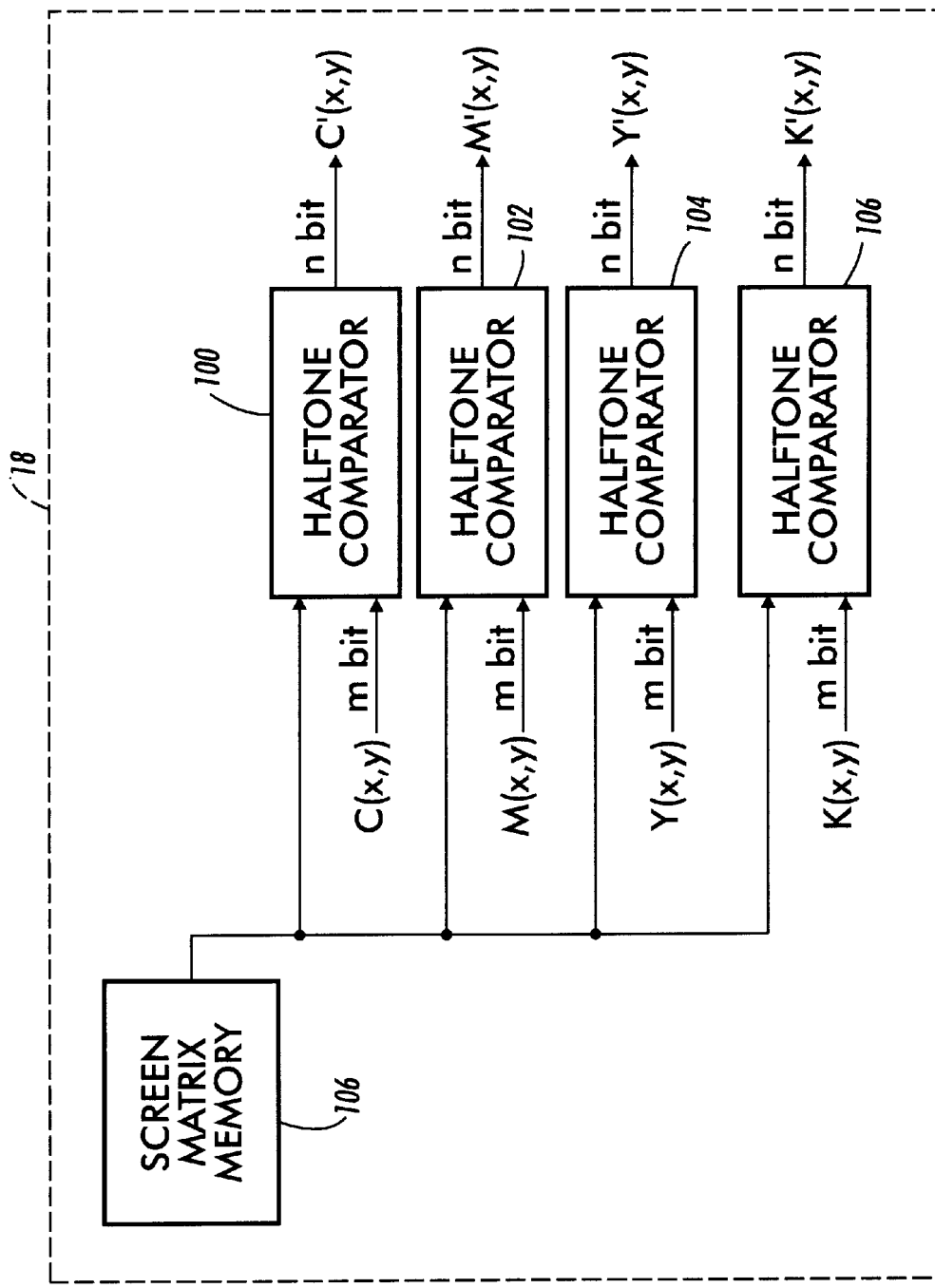
Figure 3:
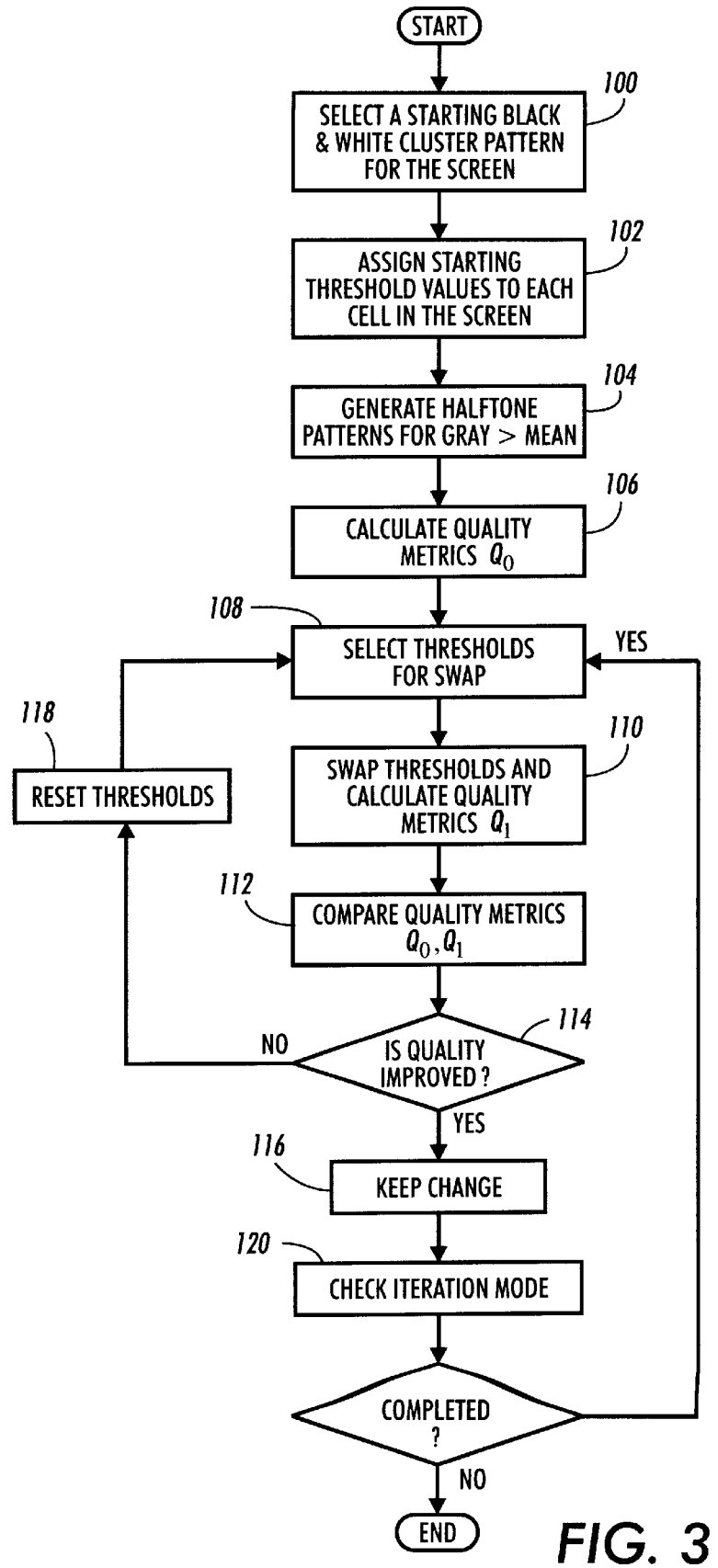

These and other aspects of the invention will become apparent from the following descriptions used to illustrate a preferred embodiment of the invention, read in conjunction with the accompanying drawings in which:

FIGS. 1 and 2 represent a halftoning system in which the present invention finds use; and FIG. 3 a flow chart of process for finding the quality measurement;

Referring now to the drawings where the showings are for the purpose of describing an embodiment of the invention and not for limiting same, a basic image processing system is shown in FIG. 1. In the present case, gray image data may be characterized as image signals, each pixel of which is defined at a single level or optical density in a set of 'c' optical density levels, the number of members in the set of levels being larger than desired. Each pixel will be processed in the manner described hereinbelow, to redefine each pixel in terms of a new, smaller set of 'd' levels. In this process, 'c' and 'd' are integer values representing pixel depth, or a number of signal levels at which the pixel may appear. One common case of this method includes the conversion of data from a relatively large set of gray levels to one of two legal or allowed binary levels for printing in a binary printer.

As used herein, the term "dot pattern" refers to a product or an image resulting from a screening process. A "screen cell", as used herein, refers to the set of pixels which together will form the dot pattern, while the term "screen matrix" will be used to describe the set of values which together make up the set of threshold to be applied. A "pixel" refers to an image signal associated with a particular position in an image, having a density between white and black. Accordingly, pixels are defined by intensity and position. A dot pattern is made up of a plurality of pixels. These terms are used for simplification and it should be understood that the appropriate sizing operations have to be performed for images where the input resolution in terms of scan pixels is different from the output resolution in terms of print pixels.

Dots are said to be clustered when spots or pixels forming the dots turn ON in a relationship that tends to group the ON pixels together, in distinction from non-clustered dots which tend to turn ON pixels for successive gray levels as far apart in the dot as possible. Dots may have a plurality of clusters formed throughout a dot, in order to simulate the appearance of a high frequency dot with a dot that has a large number of gray levels.

In a typical color system, color documents are represented by multiple sets of image signals, each set (or separation) represented by an independent channel, which is usually processed more or less independently. A "color image" as used herein is therefore a document including at least two separations, such as in the Xerox 4850 Highlight Color Printer and commonly three or four separations, such as in the Xerox 4700 Color Laser Printer, Xerox 5775 Digital Color Copier, or the Xerox 4900 printer, or sometimes more than four separations (a process sometimes called hi-fi color). One possible digital copier (a scanner/printer combination) is described for example, in U.S. Pat. No. 5,014,123 to Imoto, incorporated herein by reference. Each separation provides a set of image signals which will drive a printer to produce one color of the image. In the case of multicolor printers, the separations superposed together form the color image. In this context, we will describe pixels as discrete image signals, which represent optical density of the document image in a given small area thereof. The term "pixel" will be used to refer to such an image signal in each separation, as distinguished from "color pixel", which is the sum of the color densities of corresponding pixels in each separation. "Gray", as used herein does not refer to a color unless specifically identified as such. Rather, the term refers to image signals which vary between maximum and minimum, irrespective of the color of the separation in which the signals are used.

With reference now to FIG. 1, which shows a general system requirement representing the goal of the invention, an electronic representation of an original document (hereinafter, an image) from image input terminal such as scanner 10 derives electronic digital data in some manner, in a format related to the physical characteristics of the device, and commonly with pixels defined at m bits per pixel. Common color scanners, such as, for example, Xerox 5775 Digital Color Copiers, or the Pixelcraft 7650C, produce 8 bit/pixel data, at resolutions acceptable for many purposes. Since this is a color document, the image is defined with two or more separation bitmaps, usually with identical resolution and pixel depth. The electronic image signals are directed through an image processing unit (IPU) 16 to be processed so that an image suitable for reproduction on image output terminal or printer 20 is obtained. Image processing unit 16 commonly includes a halftone processor 18 which converts m bit digital image signals to n bit digital image signals, suitable for driving a particular printer, where m and n are integer values. It also well within the contemplation of the present invention, to derive images electronically. In such cases, the images may be represented by a page description language file, describing the appearance of the page. In such a case, the IPU might include processing element for decomposition of the page, and color conversions elements for providing appropriate signals for driving a printer.

FIG. 2 shows the halftone processor 18 operational characteristics. In this example, there is illustrated a color processing system, using four separations, C(x, y), M(x,y), Y(x, y), K(x, y), obtained and each processed independently for halftoning purposes to reduce an m-bit input to an n-bit output. It will be appreciated that the invention is also applicable to the "single separation" or black and white reproduction situation as well. Accordingly, we show a source of screen matrix information, screen matrix memory 106, which provides one input to each comparator 100, 102, 104, 106 and 108 for each separation, where the other comparator is the m bit separation bitmap. The output is m bit output, which can be directed to a printer. This illustration is highly simplified, in that distinct screen matrices may be supplied to each comparator. As will become apparent in the ensuing discussion, the invention applies to black and white, as well as color images.

Now, the principle of the present invention will be discussed. Since we only need to consider the "visible" clusters, we evaluate the black clusters above the mean for designing the distribution of the upper-half threshold values. Here, we propose our criterion of "visual pleasure" for halftone images created by cluster screens:

A. At any level of the input, all "visible" clusters should have the same shape and the same size;

B. All adjacent "visible" clusters should be equal-distance separated.

Obviously, neither requirement can be realized by halftone screens with finite numbers of elements. However, we can use these requirements to define a merit function, which measures the departure of the real output from the idealized one. Mathematically, we use the following calculations to implement the criterion proposed above:

1. Find the centroid of each cluster:

$$x_o = \Sigma x/n, \; y_o = \Sigma y/n,$$

where $\Sigma$ is the summation of the coordinates x, y over all black pixels in the specified cluster;

2. Calculate the momentum of inertia of each cluster:

$$m = \Sigma(x-x_o)2 + (y-y_o)2,$$

where $\Sigma$ is over all black pixels;

3. For each pair of clusters, calculate the distance between the two centroids:

$$d_{ij} = sqrt[(x_{io}-x_{jo})2 + (y_{io}-y_{jo})2];$$

4. Sum m and ni·nj/dij over all levels above the mean and all clusters at each level:

$$Q_m = \Sigma_m, \; Q_d = \Sigma n_i \cdot n_j / d_{ij},$$

where n is the total number of black pixels in each cluster.

Now, we can translate the proposed criterion in mathematics:

A. Minimizing the penalty function Qm, which requires all black pixels grouped in similar clusters;

B. Minimizing the penalty function Qd, which requires all clusters separated in maximal distances.

Accordingly, the design procedure for the upper-half threshold levels in a clustered-dot halftone screen is described as follows, as illustrated in FIG. 3:

1) At step 100, a black-white cluster pattern, e.g., a checkerboard pattern, is chosen to divide the entire screen into two equal-area regimes: one is for all threshold values greater than the mean, and another is for the rest. This pattern defines the basic structure of the halftone screen in line frequency and its direction. Since the line frequency dominates the appearance of all halftone outputs created by the cluster screen, it is usually specified prior to the design.

2) At step 102, threshold values, from 1 to N/2, are assigned to one regime defined by step 100, while other values, from N/2+1 to N, are filled into another. This assignment can be a randomly filling, but most likely is copying from previous works, i.e., either from an existing clustered-dot screen or from the result of previous runs of the described automatic design.

3) At step 104, halftone patterns with input levels from N/2+1 to N are generated by the screen assigned. Since the halftone screen is applied periodically, the shortest distance between two clusters is not necessary within one screen. The size of halftone patterns should be large enough to contain at least four screens in a two-by-two arrangement, therefore, the shortest distance can be chosen from all possible combinations.

4) At step 106, the quality metric is calculated. In our example, we calculate and store the centroid and the second-order momentum about the centroid for each cluster at each input level.

5) At step 108 pair of pixels is randomly chosen from the regime with upper-half threshold values.

6) At step 110, the thresholds are swapped for two chosen pixels and we calculate the centroid and momentum with swapped values.

7) At step 112, we compare the quality metrics, or find the difference of the penalty functions $Q_m$ and $Q_d$ defined above caused by the swapping. In our experiments, we take the weighted sum of $Q_m$ and $Q_d$ as the total penalty and we have found that the optimization result is not sensitive to the choice of weights. We chose such weights that the changes of penalty functions $Q_m$ and $Q_d$ from each iteration is approximately equal at beginning of the optimization.

8) At step 114, f swapping results in lower penalty, keep the change at step 116. Otherwise, restore the previous values by resetting the thresholds at step 118.

9) Repeat the iteration from steps 108–118 until the desired convergence is reached, by checking an iteration metric 120. If the requirement of the iteration metric is met, we store the values obtained and complete the process.

It is possible that, depending on the obtained value of the merit function, in some percentage of iterations, the changed values are kept even though they do not improve the merit function, a process known as simulated annealing.

Turning now to FIG. 3 and an implementation of the invention, the invention is readily implemented in a general purpose computer, programmed to generate the screen matrix values. Once obtained, the screen matrix values may be readily entered and stored into a halftoning device memory, such as that shown in FIG. 2.

Typically speaking, threshold screens will be calculated and stored for later distribution as screen matrices of threshold values. Upon later distribution, these matrices can be downloaded in an appropriate manner into device memories for use as required.

The resulting threshold screens may be used for the generation of gray in monochromatic images. They may also be used for the generation of color separations in polychromatic or other multiple separation images. In polychromatic or color images, these clustered screens may be used exclusively, or in combination with other stochastic or non-stochastic screens, as taught, for example, by U.S. Pat. No. 5,394,252 to Holladay et al.

The disclosed method may be readily implemented in software using object oriented software development environments that provide portable source code that can be used on a variety of computer or workstation hardware platforms. Alternatively, the disclosed image processing system may be implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

I claim:

1. A printing system suitable for forming marks on a substrate at one of c possible levels of colorant, and receiving image signals represented at d possible levels, where d>c, and having a halftone processor to reduce the number of levels at which the image is represented from d levels to c levels in order to replicate gray level printing, including:

a memory, storing a set of halftone threshold level signals, each threshold signal corresponding to a unique location in a halftone cell;

a comparator, receiving said image signal and one of the halftone threshold signals from the memory, and producing an output signal at one of c possible levels, varying according to the comparison of said halftone threshold signal to said image signal to cause marking at a selected location on a substrate;

said set of threshold level signals together forming a screen matrix arranged for use with respect to the image to generate multiple clusters of printed spots within a single repetition of the screen and generated by a dot clustering process which provides the screen by approximating a condition where:

A. At a level of the input, substantially all clusters have approximately a same shape and a same size; and B. Adjacent clusters are approximately equal-distance separated.

* * * * *